*Martin & Wambaugh,*
*Circular Saw Mill.*

N°18,942.  Patented Dec. 22, 1857.

AM. PHOTO-LITHO. CO. N.Y. (OSBORNE'S PROCESS.)

UNITED STATES PATENT OFFICE.

ALEX. C. MARTIN AND M. M. WOMBAUGH, OF CINCINNATI, OHIO, ASSIGNORS TO A. C. MARTIN AND RICHARD ASHCROFT, OF SAME PLACE.

METHOD OF GOVERNING THE CUT OF CIRCULAR SAWING MACHINERY.

Specification of Letters Patent No. 18,942, dated December 22, 1857.

*To all whom it may concern:*

Be it known that we, A. C. MARTIN and MAHLAN M. WOMBAUGH, of Cincinnati, in the county of Hamilton and State of Ohio, have invented a new and useful Improvement in Circular-Saw Machines; and we do hereby declare that the following is a full, clear, and exact description of the same, reference being had to the annexed drawings, making a part of this specification, in which—

Figure 1:
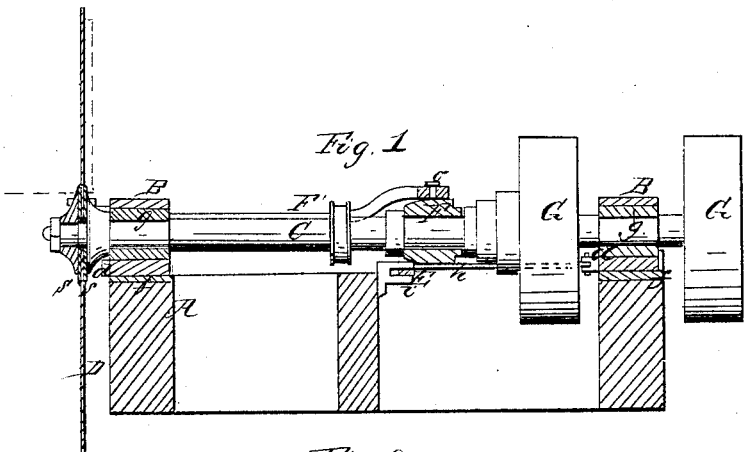
Figure 2:
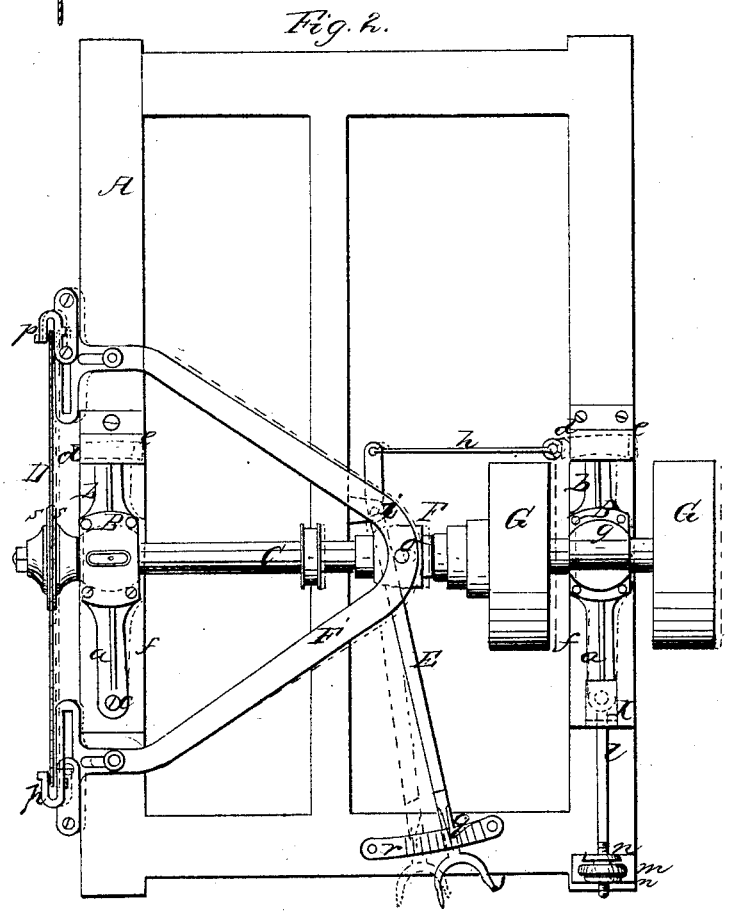

Figure 1 is a vertical and central section of our improvement. Fig. 2 is a plan or top view of ditto.

Similar letters of reference indicate corresponding parts in the two figures.

To enable those skilled in the art to fully understand and construct our invention we will proceed to describe it.

A represents a rectangular frame at each side of which a plumber block B is attached. These plumber blocks are not attached to the frame in the usual way; for each block is cast with projecting bars (*a*) (*b*), a bar being at each end of each block, as shown clearly in Fig. 2. The end of the bar (*a*) of the innermost plumber block is pivoted as shown at (*c*) to a metal plate (*f*) which is fitted in the frame A, and the ends of the bars (*b*) of both plumber blocks have segment guides (*d*) formed on them, which guides are fitted and work in sockets (*e*) attached to one end of the plates (*f*).

Within the plumber blocks B, B, circular bearings (*g*) are placed, and C is a saw arbor which is fitted in said bearings. A plan or top view of one bearing is clearly shown in Fig. 2. The bearings (*g*) are allowed to turn freely in the blocks B, as internally they are of circular shape.

D is a circular saw attached to one end of the arbor C. The outermost plumber block B or, the one farthest from the saw D has a rod (*h*) attached to its segment. This rod (*h*) is connected to a lever E which is pivoted to the frame A as shown at (*i*), the outer end of the lever having a fork (*j*) formed on it, as shown clearly in Fig. 2.

The outermost plumber block is not pivoted directly to its plate (*f*), but to the end of a screw rod (*l*) which passed through a ledge (*k*) on the plate, said rod having a circular thumb-nut (*m*) placed on it, the nut being fitted between plates or ledges (*u*) (*n*) on the frame.

On the arbor C, a sleeve or collar F is placed loosely, the arbor being allowed to turn freely within the sleeve or collar. To this sleeve or collar a V-shaped bar F is attached at the angle or bend, as shown at (*o*) Fig. 2. To the outer ends of the bar F the usual saw guides (*p*) are attached.

The outer end of the lever E has an index (*q*) attached to it. This index works over a graduated plate (*r*) which is attached to the frame A, the outer end of the lever E working underneath the plate (*r*).

G G represent driving pulleys which are placed on the arbor C.

To each side of the saw D and concentric with it, a circular plate (*s*) is secured.

The operation is as follows: While the saw D is cutting it will be seen that it is allowed to give or yield laterally as the plumber blocks B are allowed to work one on the point (*c*) and the other on the point which connects it with rod (*l*), and as the bearings (*g*) are of circular form they will not be affected as regards their proper relative position with the arbor C because they are fitted loosely in the plumber blocks. The operator whose leg is kept in the fork (*j*) may by simply actuating the lever E throw the saw from the log so that the log may be gigged back without coming in contact with the saw. Thus the usual lateral play is allowed the saw, so that it may conform to the spring of the log as the log is gigged back.

By turning the nut (*m*) more or less "dip" or "clearance" may be given the saw, that is, the saw may be turned in toward the center of the log to a greater or less degree, as may be desired. This position of the saw is important, for it prevents the back part of the saw from rubbing against the log and marring the work. This "dip" or "clearance" as it is technically termed, requires to be varied according to the quality or character of the log being sawed. If the wood is hard and cross grained a slight "dip" is only required, as the saw will cut clean and smooth, and the teeth of the saw at the back part will not come into contact with the log. If, however the wood is soft the saw will not cut clean and smooth, the fibers will project from the sawed side of the log and the back part of the saw will be liable to rub against the log. It frequently happens that the "dip" requires to be changed while sawing the same log, as logs often vary in density one portion being hard and another portion soft.

It will be seen that by attaching the guides (p) to the bar F the guides will move with the saw, and consequently will not, as in other machines, serve as obstructions to prevent the lateral play of the saw, and to injure the same by bending it. The edges of the plates (s) (s) fit in the saw "kerf" and prevents the log from acting directly against the saw plate near its periphery, and the saw therefore is prevented from being bent or "dished" by the action of the log against it.

We would here remark that we do not claim broadly the shifting of the position of the saw and arbor so that the saw shall cut in toward, or from, the log; an example of such an arrangement may be seen in Wm. M. Ferry's patent of July 21, 1857. Nor do we claim the broad idea of giving a lateral adjustment or movement to the saw and arbor. John Haw's patent of June 23rd, 1857, is an example of this. But to the best of our knowledge and belief it is new to cause the mandrel C, to work in governable, swinging, circular joint swivel plumber boxes B, B, employed in combination with the angular guides F', and index lever E, when all the above parts are arranged and operate in the manner and for the purposes herein set forth. It is also new to give the plumber boxes B, B, a side end or lateral swinging movement by an arrangement substantially like that herein shown. It is also new to provide the plumber blocks B, with bars a, b, and to pivot said plumber blocks (by means of bars a, b,) at c, c. It is also new to provide the ends of the bars (b,) of the plumber blocks B, with segment guides (d.) It is also new to employ an indicating and adjusting lever E, connected by rod (h,) with one of the guides (d,) so that when the lever E, is moved both plumber blocks will swing on the pivots (c, c.) It is also new to provide the above plumber blocks B, with circular bearings (g,) to allow for the aforesaid swinging of the plumber blocks, or the adjustment of either of said blocks in order to change the horizontal line of the arbor.

In starting our machine the index point (q,) of lever E, is set in the center of plate (r). Any change in the line of cut by the saw of course produces a movement of the arms (a, b,) which movement is instantly indicated by the index point of lever E. If the saw is inclined to follow the grain of the wood and cut into the log, the lever E, indicates such tendency by moving the index point (q,) to the right, and the divisions on plate (r,) show the exact degree of such movement. On seeing any such movement of lever E, the operator turns hand wheel (m,) and shifts or withdraws the plumber block upon that side of the machine. This shifting of the plumber block changes the line of the arbor and saw and causes the latter to cut its way out of the log. And when the saw begins to cut outwardly the index point (q,) gradually moves to the left. When the index has returned to the division on the plate (r,) at which it was originally set, the operator ceases to turn wheel (m.)

If the saw after being set by the lever E, to cut on a given line, should tend to cut out of the log, the index pointer (q), will move to the left; seeing which movement the operator shifts the plumber block by means of wheel (m,) and restores the saw to its proper line, in the manner before described. This regulation of the cut of the saw is sometimes necessary more than once in cutting a single board; again in some kinds of wood, the whole log may be cut up without changing the adjustment. After a board is cut, the saw with its arbor is moved laterally, away from the log, so that it may run back for a new cut, by moving lever E, to the left. This movement of lever E, causes the plumber blocks to swing on their pivots (c,) and move the saw and arbor, and all of their attachments laterally.

By our machine we produce lumber of uniform thickness and avoid all the inclination of the saw to follow the grain of the wood which causes friction, heating, expanding, buckling and spotting and consequent ruin of the saw and otherwise injures the driving power by friction. Under the old mode of running saws we have seen saws under a full head of steam, brought up to a stand still in a moment on account of the friction of the saw while inclining to follow the grain of the log, either in or out of the log. These effects are all done away with in our mill by the angular arms moving with the mandrel and keeping the saw in perfect line, at the same time the end of the mandrel farthest from the saw is thrown forward or back, carrying with it all the attachments of the saw bodily, and producing the desired effect on both saw and lumber. By the side end government of the mandrel or plumber blocks in which it is placed, the sawyer can with a single full revolution of the screw wheel (m) cause the saw to cut its way in or out of the log, at any time he may desire, in order to render the lumber of even thickness. When the board is sawed off the log, the operator moves lever E, as above described, so as to take the saw and all of its attachments away from the log any distance the sawyer desires, in order not to allow the saw to rub the log and create an amount of friction or roughen the board that is to come off by the next cut; after this the sawyer again moves lever E, and places the saw in its position as before, when entering the log, and in that position it remains till the log either springs, or the saw is following the grain.

If the log springs while the saw is running through the log, by our arrangement, we so set the saw as to make that board of uniform thickness throughout, and when we commence the next board we set the saw so as to have the end of the board of the proper thickness, we run the saw straight through the log, and make the other end of the board, the proper thickness; this board will be of the proper thickness at each end, but too thick in the middle; but this middle thickness is entirely obviated by running the board through the planing machine.

Having thus described our invention, what we claim as our invention, and desire to secure by Letters Patent, is—

1. The mandrel C, when working in governable, circular joint, swivel boxes B, B, in combination with angular guide F′, and lever E, when arranged substantially in the manner herein set forth for the purposes specified.

2. We also claim the side end or lateral swinging movement of plumber blocks B, B, when arranged substantially as herein set forth.

A. C. MARTIN.
M. M. WOMBAUGH.

Witnesses:
Geo. R. Bray,
Frank Vidal.